United States Patent
Michiels (10) Patent No.: US 12,511,237 B2
(45) Date of Patent: Dec. 30, 2025

(54) MEMORY ADDRESS CACHING FOR NEURAL NETWORKS

(71) Applicant: Synopsys, Inc., Sunnyvale, CA (US)

(72) Inventor: Tom Michiels, Leuven (BE)

(73) Assignee: Synopsys, Inc., Sunnyvale, CA (US)

( * ) Notice: Subject to any disclaimer, the term of this patent is extended or adjusted under 35 U.S.C. 154(b) by 80 days.

(21) Appl. No.: 18/489,260

(22) Filed: Oct. 18, 2023

(65) Prior Publication Data

US 2025/0130946 A1    Apr. 24, 2025

(51) Int. Cl.
  *G06F 13/28* (2006.01)
  *G06F 12/0817* (2016.01)
  *G06F 12/0853* (2016.01)

(52) U.S. Cl.
  CPC ...... *G06F 12/0853* (2013.01); *G06F 12/0822* (2013.01); *G06F 13/28* (2013.01)

(58) Field of Classification Search
  CPC ... G06F 13/28; G06F 12/0822; G06F 12/0853
  USPC .......................................................... 710/26
  See application file for complete search history.

(56) References Cited

U.S. PATENT DOCUMENTS

| | | | | |
|---|---|---|---|---|
| 5,956,517 A | * | 9/1999 | Okamoto | G06F 9/4494 712/201 |
| 2010/0161923 A1 | * | 6/2010 | GadelRab | G06F 12/1027 711/170 |
| 2010/0312971 A1 | * | 12/2010 | Moallem | G06F 1/3203 711/135 |
| 2011/0029750 A1 | * | 2/2011 | Jang | H04W 4/029 711/E12.001 |
| 2012/0147023 A1 | * | 6/2012 | Cho | G09G 5/393 345/557 |
| 2013/0124800 A1 | * | 5/2013 | Priel | G06F 12/0877 711/118 |
| 2013/0159625 A1 | * | 6/2013 | Lieske | H04N 19/423 711/165 |
| 2014/0164702 A1 | | 6/2014 | Yasufuku et al. | |
| 2015/0278131 A1 | * | 10/2015 | Hesse | G06F 13/28 710/308 |
| 2015/0347297 A1 | | 12/2015 | Hagersten et al. | |
| 2015/0371689 A1 | | 12/2015 | Li et al. | |
| 2022/0164128 A1 | * | 5/2022 | Uhrenholt | G06F 3/0604 |
| 2022/0414038 A1 | * | 12/2022 | Pawlowski | G06F 13/28 |

(Continued)

FOREIGN PATENT DOCUMENTS

CN    115033185 A    9/2022

OTHER PUBLICATIONS

International Search Report and Written Opinion for International Application No. PCT/US2024/051844, mailed Dec. 6, 2024, 13 Pages.

*Primary Examiner* — Christopher B Shin
(74) *Attorney, Agent, or Firm* — Lowenstein Sandler LLP (57) ABSTRACT

A request to provide an application with direct memory access to data stored at an external memory address of an external memory is received. Responsive to determining that the external memory address is not registered in a cache, the data is copied from the external memory address to a first internal memory address within the internal memory. A first cache line, within the cache, associated with the external memory address is updated to include a reference to the first internal memory address. The data is provided from the internal memory to the application.

20 Claims, 5 Drawing Sheets

(56) References Cited

U.S. PATENT DOCUMENTS

| | | | |
|---|---|---|---|
| 2023/0315293 A1* | 10/2023 | Awasthi | G06F 9/5016 |
| | | | 711/170 |
| 2024/0028235 A1* | 1/2024 | Sadiq | G06N 3/063 |
| 2025/0117326 A1* | 4/2025 | Govindarajan | G06F 11/1666 |

* cited by examiner

MEMORY ADDRESS CACHING FOR NEURAL NETWORKS

TECHNICAL FIELD

The present disclosure generally relates to a memory system, and in particular to memory address caching for neural networks.

BACKGROUND

A computing system can include one or more caches that store data. For example, the computing system can include cache memory that divides into three levels: a level 1 (L1) cache, a level 2 (L2) cache, and a level 3 (L3) cache. In general, a processor (e.g., a neural network (NN) accelerator) within the computing system can utilize a cache to temporarily store data retrieved from internal memory (e.g., SRAM) and external memory (e.g., DRAM). The processor can read data from and write data to the cache faster than it can read data from and write data to internal memory and external memory. The processor can read data from and write data to the internal memory faster than it can read data from and write data to the external memory. Moreover, by reading/writing from/to a cache, bandwidth to external memory can be reduced.

SUMMARY

Controller circuitry, operatively coupled to a processor, receives a request to provide an application with direct memory access to data stored at an external memory address of an external memory. Responsive to determining that the external memory address is not registered in the cache, the controller circuitry copies the data from the external memory address to a first internal memory address within the internal memory. The controller circuitry updates, within the cache, a first cache line associated with the external memory address to include a reference to the first internal memory address and provides the data from the internal memory to the application. In some embodiments, the first cache line includes a first portion corresponding to the first internal memory address, a second portion corresponding to a tag associated with the external memory address, and a third portion corresponding to an expiration number. In some embodiments, the controller circuitry invalidates the first cache line after a designated amount of time using the expiration number. In some embodiments, the first cache line is runtime configurable. In some embodiments, the processor is a neural network (NN) accelerator, and the data includes a data structure of input data associated with a workload of a NN application. In some embodiments, the processing device is a direct memory access (DMA) controller.

In some embodiments, the controller circuitry may determine the external memory address is registered in the cache. Responsive to determining that the external memory address is registered in the cache, the controller circuitry identifies, within the cache, a second cache line associated with the external memory address. In some embodiments, the second cache line includes a reference to a second internal memory address. The controller circuitry copies the data from the second internal memory address to a third internal memory address within the internal memory.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to memory caching for a neural network.

The use of neural network (NN) accelerators can greatly improve the speed and efficiency of artificial intelligence (AI) and machine learning (ML) applications, reducing the time, energy, and processing resources consumed to train and deploy neural networks. NN accelerators are specialized hardware components that are optimized to perform computations involved in training and inference of deep neural networks. For example, NN accelerators are designed to perform compute-intensive operations such as matrix multiplication, convolution, pooling, and activation functions at high speeds with high efficiency. With the growing demand for AI applications, the development of more efficient and specialized NN accelerators is becoming increasingly important.

Because NNs consume a large amount of processing resources and bandwidth, a processor (e.g., a NN accelerator) can retrieve data from an external (i.e., off-chip) memory (e.g., dynamic random-access memory (DRAM)) and temporarily store the data in a cache. The cache can provide faster access to data that is frequently used or requested by the processor to reduce latency and improve an overall performance of the system. Additionally, use of a cache can reduce traffic over an interface to external memory. However, because cache memory space is often limited, it is increasingly difficult to cache the large amount of data (e.g., tens or hundreds of Gigabytes) processed by some NN applications. For example, some NN applications (e.g., sparse submanifold convolutions, deformable convolutions, deformable attention, etc.) may process large data structures (e.g., 1,024-byte vectors) of data over several layers of the NN application. Caching such large vectors of data processed by some NNs may result in a large number of cache misses and cache thrashing, reducing overall performance of the system. Accordingly, large input vectors and output vectors may be stored within an external memory.

In view of the above, latency associated with external memory access may be reduced when it may not be reasonable to increase the capacity of an on-chip cache. Some techniques may utilize a direct memory accesses (DMA) to prefetch data from external memory prior to runtime of a workload of a NN application. DMA is a feature of computer systems that allows a hardware device (e.g., a DMA controller) to access the system's memory without involving the system's processor (e.g., NN accelerator). The DMA controller can transfer large blocks of data from external memory, which can reduce an amount of time the NN accelerator spends waiting for data, allowing the NN accelerator to perform other computations. However, such techniques that rely on a DMA fail to reduce latency for NN applications with unpredictable access patterns. An unpredictable access pattern refers to a situation where memory access requests are made in a manner that may be difficult to anticipate by a system's memory hierarchy. For example, deformable convolutions are a type of NN model that has unpredictable access patterns. Deformable convolutions have unpredictable access patterns because offsets used to shift a receptive field of the model are determined during training and can take on any value within a certain range. Thus, the exact location and shape of the receptive field for each output unit can vary depending on offsets and input features. Unpredictable memory access patterns can disrupt the performance of the memory hierarchy and render such DMA techniques unsuitable for NN applications with unpredictable memory access patterns.

Aspects of the present disclosure provide a system and method to cache memory addresses of large (e.g., 1 kilobyte (KB)) data structures processed by NN application workloads with unpredictable access patterns. A DMA controller may receive a request to provide an application (e.g., a NN application) with direct memory access to data stored at an external memory address of an external memory. The external memory may include off-chip memory (e.g., DRAM) associated with a processor (e.g., a NN accelerator) executing a workload of the NN application. The DMA controller may search a cache located on the processor to determine whether the external memory address is registered in the cache. The external memory address is registered in the cache if an index associated with the external memory address and a tag associated with the external memory address is currently present in the cache, resulting in a cache hit. In some embodiments, the cache is configured to store memory addresses that reference locations in memory where data is stored. For example, a cache line of the cache may include a reference to an internal memory address where the requested data is stored. The DMA controller may recognize the internal memory address as an addressable location within the internal memory.

In some embodiments, the DMA controller may determine that the external memory address is not registered in the cache, resulting in a cache miss. Responsive to determining that the external memory address is not registered in the cache, the DMA controller may perform a read operation at the external memory address to retrieve the requested data from external memory. The DMA controller may copy the data from a location in memory corresponding to the external memory address to a location in memory corresponding to an internal memory address. The DMA controller may update, within the cache, a cache line associated with the external memory address to include a reference to the internal memory address. The DMA controller may further provide the requested data from the internal memory to the NN application.

In some embodiments, the DMA controller may determine that the external memory address is registered in the cache, resulting in a cache hit. Responsive to determining that the external memory address is registered in the cache, the DMA controller may identify a cache line in the cache associated with the data requested by the processor. The cache line may include a reference to a first internal memory address. The DMA controller may copy the data from a location within the internal memory corresponding to the first internal memory address to another location within the internal memory corresponding to a second internal memory address. The DMA controller may further provide the requested data from the internal memory to the NN application.

With the flexibility of storing references to data in a cache, one or more embodiments of the present disclosure may store references to internal memory addresses in a cache that reduces traffic between the processor and external memory. Technical advantages of the present disclosure include, but are not limited to, storing data within internal memory and references to the internal memory within the cache such that requested data can be retrieved from internal memory, which can significantly reduce the amount of external memory accesses, thereby reducing traffic over the interface to external memory. Accordingly, the present system and method reduces off-chip data access and related power consumption, improving the system's overall energy efficiency and latency, and allowing the system to increase an overall utilization, thereby improving performance.

It should be noted that various aspects of the above-referenced methods and systems are described in detail herein below by way of example, rather than by way of limitation. The embodiments and examples provided below may reference NN applications and NN accelerators for the purpose of simplicity and brevity only. However, embodiments and examples of the present disclosure can be applied to applications with repetitive tasks occurring at a programmatic level that process large amounts of data. For example, aspects and embodiments of the present disclosure may be applied to high-performance computing applications.

Figure 1:
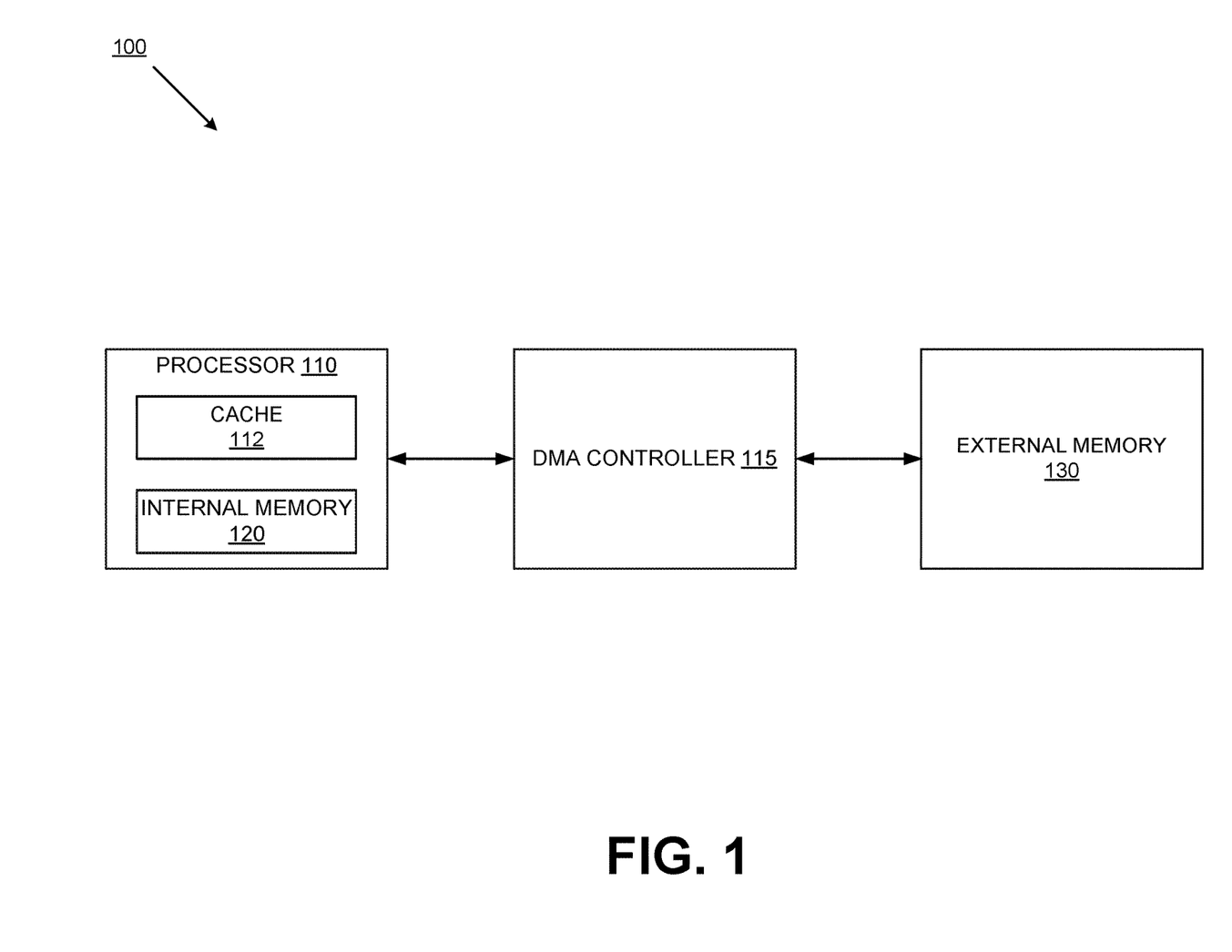
FIG. 1 illustrates an example computing system that includes a memory system, in accordance with some embodiments of the present disclosure.

FIG. 1 illustrates an example computing system 100 that includes a memory system, in accordance with some embodiments of the present disclosure. The memory system can include a direct memory access (DMA) controller 115, an internal memory 120, and an external memory 130. The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. In least one embodiment, one or more components of the computing system 100 can be packaged on the same die.

The computing system 100 can include a processor 110, such as of a host, that is operatively coupled to DMA controller 115. In some embodiments, the processor 110 may be operatively coupled to DMA controller 115 that may be a part of different types of memory systems. FIG. 1 illustrates one example of a processor 110 operatively coupled to the DMA controller 115. As used herein, "coupled to" or "coupled with" generally refers to a connection between components, which can be an indirect communicative connection or direct communicative connection (e.g., without intervening components), whether wired or wireless, including connections such as electrical, optical, magnetic, etc. The processor 110 can include a processor chipset and a software stack executed by the processor chipset. The processor chipset can include one or more cores, one or more caches, a memory controller (e.g., non-volatile dual in-line memory module (NVDIMM) controller), and a storage protocol controller (e.g., peripheral component interconnect express (PCIe) controller, serial advanced technology attachment (SATA) controller). In some embodiments, processor 110 is neural network (NN) accelerator. The NN accelerator can be in the form of dedicated hardware components such a graphical processing units (GPUs), field-programmable gate arrays (FPGAs), tensor processing units (TPUs), application-specific integrated circuits (ASICs), and the like. In some embodiments, the NN accelerator can be implemented as one or more software components that run on general-purpose CPUs or GPUs.

The processor 110 may include a cache 112 (e.g., a processor cache). In some embodiments, the cache 112 may be an on-chip cache located on a same chip as the processor 110, and may include multiple cache levels (L1, L2, L3, and L4). In some embodiments, the cache 112 may be shared between the processor 110 and the DMA controller 115, allowing both to access the cache 112 at the same time. The processor 110 may use a cache coherence protocol (e.g., a modified-exclusive-shared-invalid (MESI) coherence protocol, a modified-owned-exclusive-shared-invalid (MOESI) coherence protocol, or the like) that allows for coherent access by processor 110 and DMA controller 115.

The processor 110 may include an internal memory 120. The internal memory 120 may include any combination of different types of non-volatile memory and/or volatile memory. The internal memory 120 (also referred to as on-chip memory, herein) may be directly integrated into the same chip as processing units of the processor 110. The volatile memory may be, but is not limited to, static random-access memory (SRAM), embedded dynamic random-access memory (eDRAM), and ferroelectric random-access memory (FeRAM). The non-volatile memory may be, but are not limited to, flash memory, phase-change memory (PCM), resistive random-access memory (RRAM), and magnetic random-access memory (MRAM). The internal memory 120 may include one or more memory arrays composed of memory cells. The internal memory 120 may also include additional circuitry or components that are not illustrated. In some embodiments, the internal memory 120 may include address circuitry (e.g., a row decoder and a column decoder) that may receive an address from the DMA controller 115 and decode the address to access the internal memory 120.

The external memory 130 (also referred to as off-chip memory herein) may be secondary memory that is not located directly on processor 110. The external memory 130 may include any combination of difference types of non-volatile memory. For example, the external memory 130 may include, but is not limited to, dynamic random-access memory. Dynamic random-access memory (DRAM), flash memory, hard disk drives (HDD), solid-state drives (SSD), universal serial bus (USB) flash drives, memory cards, external hard drives, and the like. The external memory 130 may also include additional circuitry or components that are not illustrated. In some embodiments, the external memory 130 may be separate from system 100 and accessible to the system 100 over a wireless network, an ethernet port, a USB port, or other connection.

A DMA controller 115 may communicate with the internal memory 120, external memory 130, and cache 112 to perform operations such as reading data, writing data, transferring, or erasing data and other such operations without intervention from processor 110. The DMA controller 115 may include hardware such as one or more integrated circuits and/or discrete components, a buffer memory, or a combination thereof. The hardware may include a digital circuitry with dedicated (i.e., hard-coded) logic to perform the operations described herein. The DMA controller 115 may be a microcontroller, special purpose logic circuitry (e.g., a field programmable gate array (FPGA), an application specific integrated circuit (ASIC), etc.), or another suitable processor.

In general, the DMA controller 115 may receive commands or operations from the processor 110 and may convert the commands or operations into instructions or appropriate commands to perform the desired memory operation. Processor 110 may perform other operations while the memory operation is in progress and may receive an interrupt from the DMA controller 115 when the memory operation is finished. For example, the processor 110 may initiate a transfer of data from external memory 130 to internal memory 120. The DMA controller may transfer the data from external memory 130 to internal memory 120 while the processor 110 performs other operations. Responsive to completing the transfer of the data from external memory to internal memory, the DMA controller 115 may send an interrupt to processor 110.

The DMA controller 115 may include multiple hardware registers that can be written and read by processor 110. DMA controller 115 may include registers such as a counter register to hold the number of bytes to be transferred; an address register to hold a memory address of a source and destination for a data transfer; one or more control registers to control operations of DMA controller 115; a status register to indicate a status of a current DMA transfer, including completion status and error conditions; etc. DMA controller 115 may include a DMA interface bus (not illustrated) to interface between the DMA controller 115 and a system bus.

In some embodiments, the DMA controller 115 may perform operations described herein. DMA controller 115 can store and retrieve references to the internal memory 120 within the cache 112 to perform operations described herein, as described in detail below with respect to FIG. 2. In some embodiments, DMA controller 115 may perform operations described herein using software (e.g., instructions running or executing on processor 110). In some embodiments, DMA controller 115 may perform operations described herein using processing logic that may include hardware (e.g., a processing device, circuitry, dedicated logic, microcode, hardware of a device, integrated circuit, etc.). In some embodiments, DMA controller 115 may perform operations described herein using a combination of processing logic and software.

Figure 2:
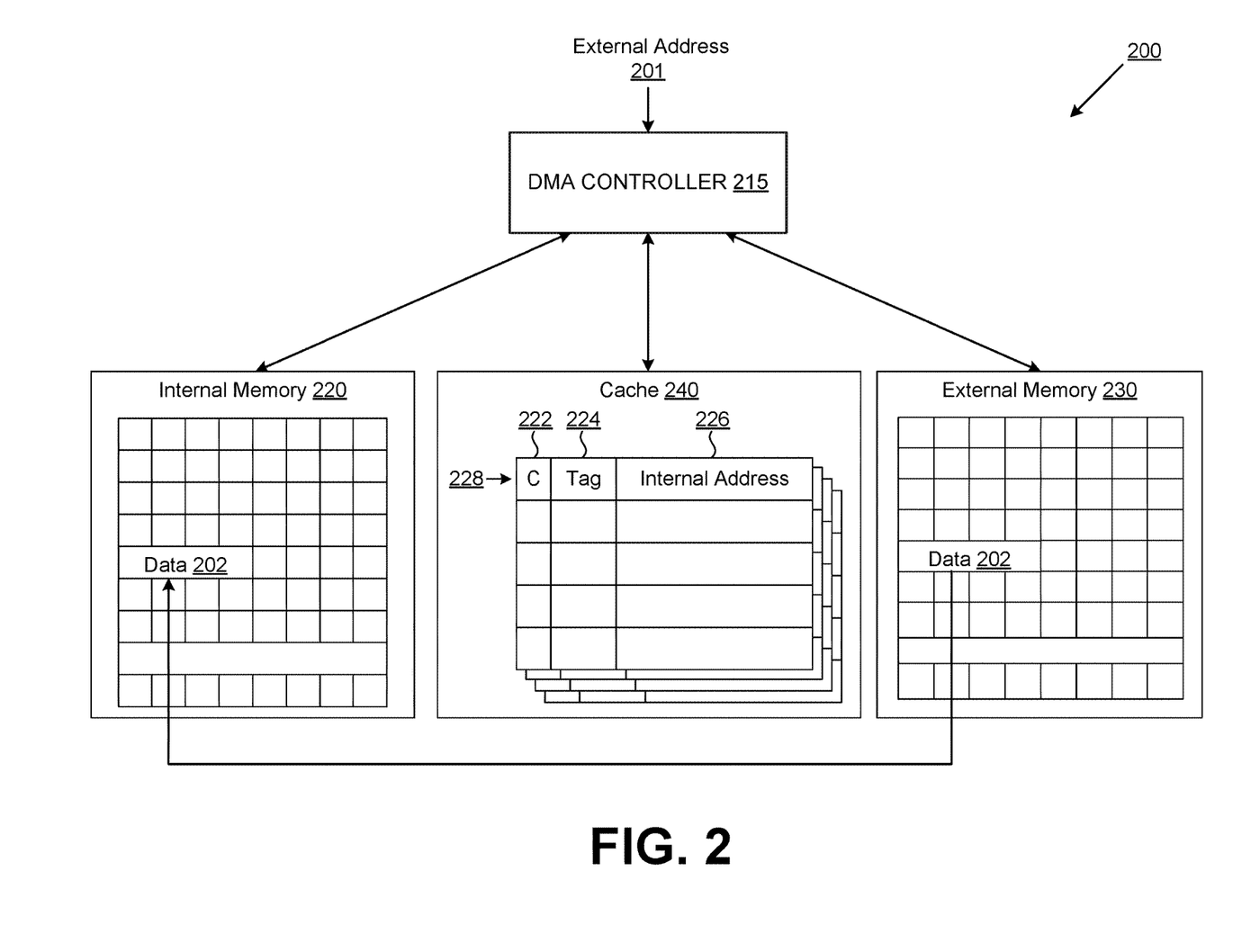
FIG. 2 is a diagram illustrating a memory address caching system, in accordance with some embodiments of the present disclosure.

FIG. 2 is a diagram illustrating a memory address caching system, in accordance with some embodiments of the present disclosure. Diagram 200 may include similar elements illustrated by computing system 100, as described with respect to FIG. 1. It should be noted that elements of FIG. 1 can be used herein to help describe FIG. 2. The operations described with respect to FIG. 2 are described to be performed serially for the sake of illustration, rather than limitation. Although shown in a particular sequence or order, unless otherwise specified, the order of operations can be modified. Thus, the illustrated embodiments should be understood only as examples, and the described operations can be performed in a different order, while some operations can be performed in parallel. Additionally, one or more operations may be omitted in some embodiments. Thus, not all described operations are required in every embodiment, and other process flows are possible. In some embodiments, the same, different, fewer, or greater operations may be performed. Diagram 200 illustrates a memory address caching technique that utilizes a DMA controller 215 to cache references (e.g., memory addresses) to data processed by a workload of a NN application executing on a NN accelerator.

The NNs described herein can include multiple layers of connected nodes that can be trained with input data to solve complex problems. For example, images can be used as input data for constructing, training, and deploying a NN model for image classification or object detection. Once the NN is trained, the NN can be deployed and used to identify and classify objects or patterns in an inference process through which the NN application processes information from a given input to infer a result. During an inference process for a given workload, the NN application can perform memory accesses to retrieve or more different types of data from external memory. For example, the NN application can read input data from external memory that is supplied the NN application for inference. In another example, the NN application can read weights or biases from external memory for use within the NN application. Weights and biases are learned during training of the NN and are used by the NN application to transform input data into output data. Weights and biases can be fetched by layers of the NN application from external memory. In some instances, data (e.g., input data, weights, biases, etc.) processed by the NN application may be read multiple times from external memory.

DMA controller 215 can be configured to receive a request to provide an application (e.g., a NN application) with direct memory access (DMA) to data 202 stored at an external memory address 201 of an external memory 230. In some embodiments, the request can be received from a processor (e.g., processor 110). In some embodiments, the processor may be a neural network (NN) accelerator and the requested data may be data associated with a workload of a NN application executing on the NN accelerator, as described above with respect to FIG. 1. DMA controller 215 may determine whether external memory address 201 is registered in cache 240.

The cache 240 may be configured to store references to internal memory addresses of internal memory 220. In some embodiments, cache 240 may correspond to cache 112 of FIG. 1, internal memory 220 may correspond to internal memory 120 of FIG. 1, and external memory 230 may correspond to external memory 130 of FIG. 1.

Given the received external memory address 201, the DMA controller 215 can determine whether the external memory address is registered in the cache 240. In some embodiments, a portion of the external memory address may include an index corresponding to cache 240. The index can indicate a set within cache 240. A set is a group of cache lines within cache 240 that share the same index bits. In some embodiments, a portion of the external memory address 201 may include a tag corresponding to cache 240. For example, external memory address 201 may include a tag 224 corresponding to cache line 228 within the cache 240. For each cache line in the identified set, DMA controller 215 can compare a tag associated with the respective cache line to the tag of external memory address 201. If there is a match based on the comparison, then the external memory address 201 is registered in the cache 240. If there is no match, then the external memory address 201 is not registered in the cache 240.

Responsive to determining that the external memory address 201 is not registered in the cache 240, DMA controller 215 may copy the requested data from a location within the external memory 230 corresponding to the external memory address 201 to a location within the internal memory 220 corresponding to an internal memory address. For example, external memory address 201 may reference data 202 stored within the external memory 230, as illustrated. The DMA controller 215 may copy the data 202 from the external memory 230 to the internal memory 220. To copy data 202, DMA controller 215 may read data 202 from external memory 230 and store data 202 at an internal memory address within internal memory 220, as illustrated. In some embodiments, the DMA controller 215 may update, within the cache 240, the cache line associated with the external memory address 201 to include a reference to the internal memory address 226. For example, DMA controller 215 may update cache line 228 of cache 240 to include the internal memory address 226. Additionally, DMA controller 215 may update tag 224 of cache line 228 with a tag corresponding to external memory address 201. DMA controller 215 may provide the data 202 stored at internal memory address 226 to the NN accelerator.

Responsive to determining that the external memory address 201 is registered in the cache 240, DMA controller 215 may copy the data from an internal memory address referenced in the cache line to another internal memory address. For example, DMA controller 215 may determine external memory address 201 is registered in the cache 240 at cache line 228. DMA controller 215 may identify internal memory address 226 within the cache line 228. DMA controller 215 may identify data 202 within a location in internal memory 220 corresponding to the internal memory address 226. DMA controller 215 may read data 202 from the location in internal memory 220 corresponding to the internal memory address 226 and copy data 202 to another location within the internal memory 220.

In some embodiments, a NN accelerator (e.g. processor 110) may request the DMA controller 215 read data 202 when the DMA controller 215 copies the data 202 from external memory 230 to internal memory 220 or when the DMA controller 215 copies the data 202 from internal memory 220 to another location within internal memory 220. The NN accelerator may have specific requests for the format and organization of data being stored in internal memory 220 to allow the NN accelerator to efficiently operate on the data 202. Accordingly, the DMA controller 215 may transform the data 202 into appropriate data structures and formats requested by the NN accelerator. For example, the NN accelerator may request the data 202 be organized in specific arrays or tensors, or with a particular format for the data elements (e.g., fixed-point numbers, floating-point numbers, etc.). The DMA controller 215 may reorganize data 202 according to the requested format when the DMA controller 215 generates copies of data 202 within internal memory 220. In some embodiments, the NN accelerator may support multiple data formats and allow data to be directly stored in internal memory without any additional transformation.

In some embodiments, each cache line within cache 240 may include an expiration number. The expiration number associated with a cache line that indicates whether that cache line has expired. An expired cache line may be considered invalid, meaning the internal memory address associated with the expired cache line may not be used by the processor. When an internal memory address is added to the cache 240, the associated cache line may be assigned an expiration number. The cache line can then be invalidated by changing a register that indicate which expiration numbers are valid. For example, DMA controller 215 may add cache line 228 to the cache 240 and set expiration number 222. A processor (e.g., a NN accelerator) may invalidate the cache lines by updating a register (e.g., located on the NN accelerator) that is compared with the expiration number 222 in the cache line. If the value of the register is greater than the expiration number 222, then the cache line 228 is invalid. In some embodiments, the value of the register can be a timestamp associated with the cache line 228 that is updated (e.g., incremented) on a periodic time interval (e.g., time-based cache invalidation). In some embodiments, the expiration number 222 can be updated based on an occurrence of an event (e.g., event-based cache line invalidation). For example, the value in the register can be updated (e.g., incremented, set to a define value, etc.) in response to completing a NN layer associated with the internal memory address.

During a memory access of cache line 228, the DMA controller 215 may check expiration number 222 to determine whether the cache line 228 is valid. Responsive to determining that the cache line 228 is valid, the cache 240 may provide DMA controller 215 with internal memory address 226. Responsive to determining that the cache line 228 is invalid, the cache 240 may provide an indication to DMA controller 215 that the cache line 228 is invalid, which may be considered a cache miss. It is appreciated that the above-described cache line expiration mechanism may be implemented by another cache invalidation mechanism, such as a cache refresh mechanism, a probabilistic cache expiration mechanism, or the like. In some embodiments, cache 240 may implement a cache replacement policy to determine which cache lines are to be replaced when the cache 240 is full. For example, the cache 240 may implement a least recently used (LRU) algorithm to ensure that the most recently accessed cache lines are kept in the cache.

In some embodiments, the external memory address 201 and the internal memory address 226 may reference a data structure associated with a workload of a NN application currently executing on the NN accelerator. For example, the data structure may be a 1,024-byte vector of input data associated with a first layer of a NN application, as described in detail with respect to FIG. 3B. The 1,024-byte vector of input data may be 1,024 byte-aligned in the external memory 230. The input data may also be 1,024 byte-aligned in the internal memory 220. In another example, the data structure may be a 256-byte vector of input data associated with a second layer of the NN application, as described in detail with respect to FIG. 3A. The 256 byte vectors of input data may be 256 byte-aligned in the external memory 230. The input data may also be 256 byte-aligned in the internal memory 220.

In some embodiments, cache lines in the cache 240 may be runtime configurable to account for different sizes of input data. The cache 240 may be runtime configurable meaning the cache 240 may be configured or modified prior to runtime of a given workload of an application. That is, the number of tag bits used for tagging cache lines may be adjusted to account for the size of input data to be processed by the given layer of the application. For example, the first layer of a NN application to execute on a NN accelerator (e.g., processor 110) may process 256 Byte-aligned vectors of data stored in external memory 230. Prior to runtime of the first layer, each cache line of cache 240 may be configured to include a 16-bit tag to identify the 16 most significant bits (MSB) of an external memory address associated with a particular cache line. The following 8 bits of the external memory addresses may be associated with an index of the cache 240, as described below with respect to FIG. 3A. In another example, a second layer of a NN application to execute on the NN accelerator may process 1024 byte-aligned vectors of data stored in the external memory 230. Prior to runtime of the first workload, each cache line of the cache 240 may be updated to include a 14-bit tag to identify the 14 most significant bits (MSB) of an external memory address associated with a particular cache line. The following 8 bits of the external memory address may be associated with an index in the cache 240, as described below with respect to FIG. 3B.

Figure 3A:
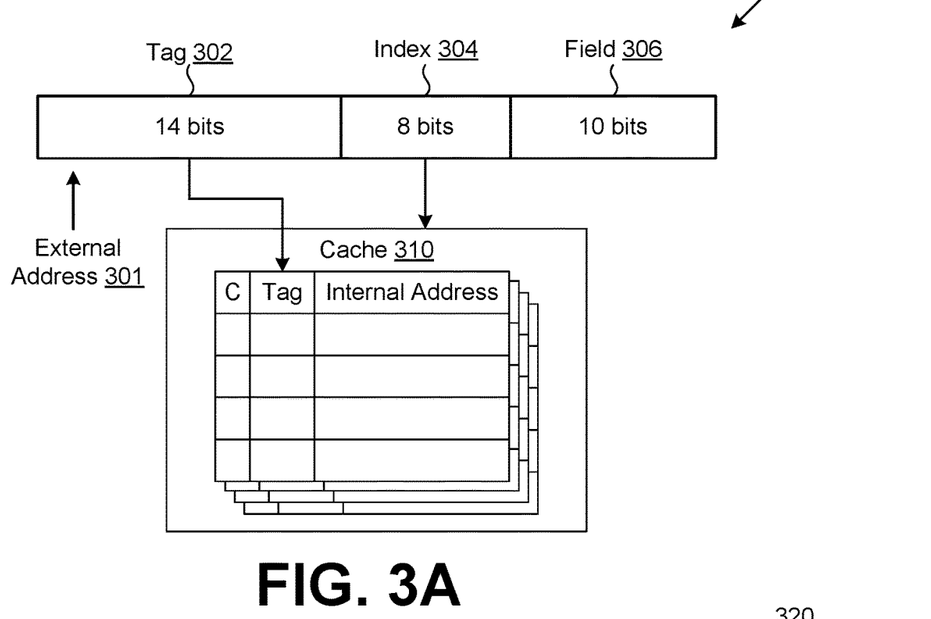
FIG. 3A is a diagram illustrating an example external memory address and a cache, in accordance with some embodiments of the present disclosure.

FIG. 3A is a diagram 300 illustrating an example external memory address 301 and a cache 310, in accordance with some embodiments of the present disclosure. External memory address 301 is an example configuration of an external memory address that references data in an external memory (e.g., external memory 230) that is 256 byte-aligned. External memory address 301 is a 32-bit address that includes a first portion corresponding to tag 302, a second portion corresponding to index 304, and a third portion corresponding to a field 306. The tag 302 is a 14-bit tag that may reference a location in the external memory corresponding to 1024 bytes of data. In some embodiments, the tag 302 corresponds to a tag within the cache 310. Index 304 is an 8-bit reference to an index within the cache 310.

In some embodiments, field 306 may be a portion of the external memory address 301 that is not used under the illustrated addressing scheme. In some embodiments, the bits corresponding to field 306 may be left as zeroes, may be written as ones, or many be written as any combination of ones and zeros. In some embodiments, the field 306 may be used for purposes other than memory addressing. For example, the field 306 may be used to indicate access permissions or other attributes of a memory block referenced by the external memory address 301.

In some embodiments, the external memory address 301 may be reformatted for memory addressing under an alternative configuration of the external memory address space and the cache 310. For example, it may be determined that a given workload of an application (e.g., a NN application) processes 256-byte vectors of data. Prior to runtime of the given workload, the external memory corresponding to external memory address 301 may be reconfigured to be 256-byte aligned. The tag 302 of the external memory address 301 may be updated from the most significant 14-bits of the external memory address 301 to the most significant 16-bits of the external memory address 321, as illustrated below with respect to FIG. 3B. Accordingly, the index 304 and the field 306 may be shifted over 2 bits to account for the increased size of that tag 322, decreasing the field 326 from 10 bits to 8 bits. The cache 310 may be updated to include 16-bit tags corresponding to the updated tag 322 of the external memory address 321, as shown in FIG. 3B.

In some embodiments, cache 310 may correspond to cache 112 of FIG. 1. In some embodiments, cache 310 may correspond to cache 240 of FIG. 2 and external memory address 301 may correspond to external memory address 201 of FIG. 2.

Figure 3B:
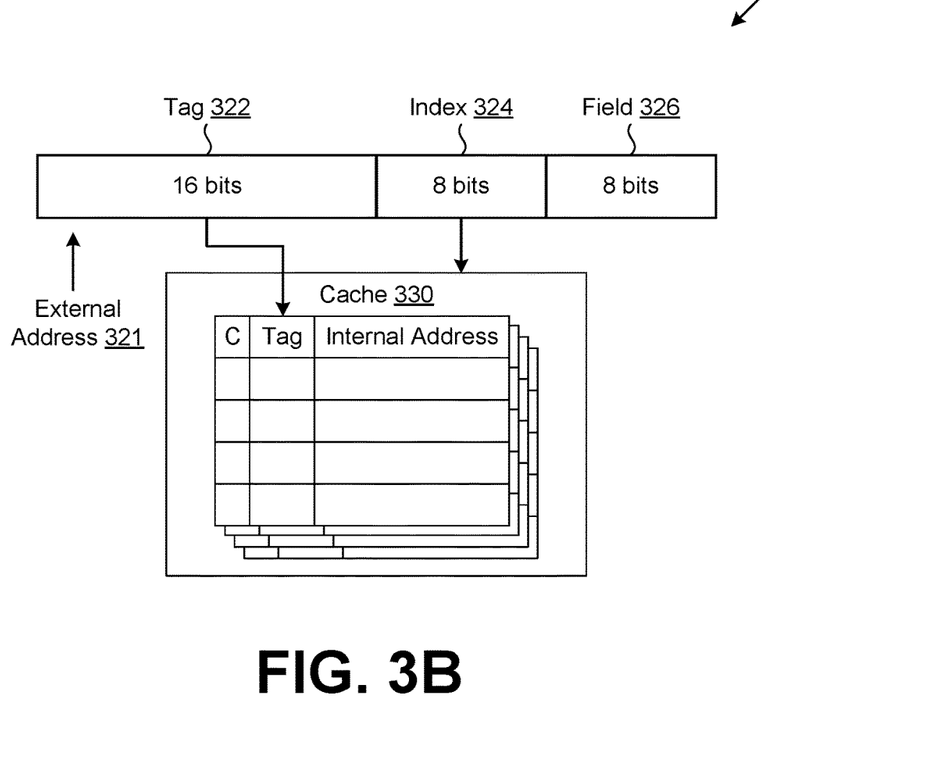
FIG. 3B is a diagram illustrating an example external memory address and a cache, in accordance with some embodiments of the present disclosure.

FIG. 3B is a diagram 320 illustrating an example external memory address 321 and a cache 330, in accordance with some embodiments of the present disclosure. External memory address 321 is an example configuration of an external memory address that references data in an external memory (e.g., external memory 230) that is 256 byte-aligned. External memory address 321 is a 32-bit address that includes a first portion corresponding to a tag 322, a second portion corresponding to an index 324, and a third portion corresponding to a field 326. The tag 322 is a 16-bit tag that may reference a location in the external memory corresponding to 256 bytes of data. In some embodiments, the tag 322 corresponds to a tag within the cache 330. Index 324 is an 8-bit reference to an index within the cache 330.

In some embodiments, field 326 may be a portion of the external memory address 321 that is not used under the illustrated addressing scheme. In some embodiments, the bits corresponding to field 326 may be left as zeroes, may be written as ones, or many be written as any combination of ones and zeros. In some embodiments, the field 326 may be used for purposes other than memory addressing. For example, the field 326 may be used to indicate access permissions or other attributes of a memory block referenced by the external memory address 321.

In some embodiments, field 326 may be a portion of the external memory address 321 that is not used under the described configuration. It can be noted that in alternative configurations, a portion of the field 326 may be utilized for memory addressing. For example, it may be determined that a given workload of an application (e.g., a NN application) may store and retrieve 1024-byte vectors of data. Prior to runtime of the given workload, an external memory corresponding to external memory address 321 may be reconfigured to be 1024-byte aligned. Accordingly, the tag 322 of the external memory address 321 may be updated from the most significant 16-bits of the external memory address 321 to the most significant 14-bits of the external memory address 301, as illustrated with respect to FIG. 3A. The index 324 and the field 326 may be shifted over to account for the decrease and the cache 330 may be updated to include 14-bit tags.

In some embodiments, cache 330 may correspond to cache 112 of FIG. 1. In some embodiments, cache 330 may correspond to cache 240 of FIG. 2 and external memory address 321 may correspond to external memory address 201 of FIG. 2.

Figure 4:
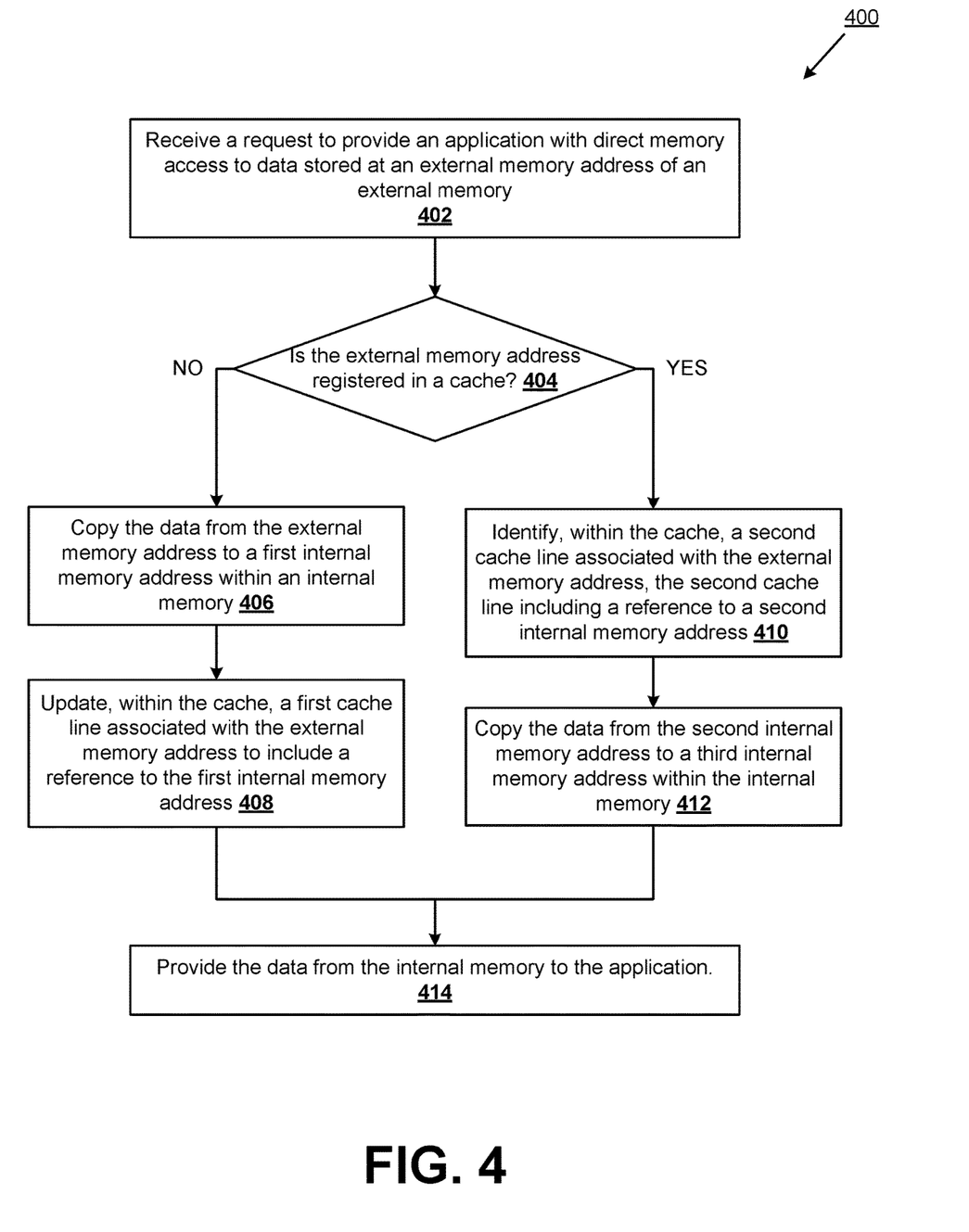
FIG. 4 depicts a flow diagram of an example method of memory address caching for neural networks, in accordance with some embodiments of the present disclosure.

FIG. 4 depicts a flow diagram of an example method of memory address caching for neural networks, in accordance with some embodiments of the present disclosure. The method 400 can be performed using controller circuitry that can include hardware (e.g., a processing device, processing circuitry, dedicated logic, microcode, hardware of a device, integrated circuit, etc.), software (e.g., instructions running or executing on a processing device), firmware, or a combination thereof. In at least one embodiment, the method 400 can be performed by a non-transitory computer-readable medium having instructions that, responsive to execution by a processor, cause the processor of a computing system to perform operations described herein. In one embodiment, method 400 can be performed by one or more components of a system, such as system 100 of FIG. 1. In some embodiments, one or more operations of method 400 may be performed by DMA controller 115 of FIG. 1. In some embodiments, one or more operations of method 400 may be performed by DMA controller 215 of FIG. 2. In some implementations, one or more operations of method 400 can be performed by one or more other machines not depicted in the figures.

For simplicity of explanation, the methods are depicted and described as a series of acts. However, acts in accordance with this disclosure may occur in various orders and/or concurrently and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At 402 of method 400, controller circuitry, operatively coupled to a processor, such as processor 110, receives a request to provide an application running on the processor with direct memory access to data stored at an external memory address of an external memory, such as external memory 130, is received. In some embodiments, the controller circuitry is a direct memory access controller, such as DMA controller 115. In some embodiments, the processor is a neural network (NN) accelerator, and the data includes a data structure of input data associated with a NN application.

At 404, the controller circuitry determines whether the external memory address is registered in a cache, such as cache 112 of processor 110. For example, the control circuitry can check the cache for an index and a tag corresponding to the external memory address. If a tag in the cache matches a tag corresponding to the external memory address (i.e., a cache hit), then the external memory address is registered in the cache. If the tag associated with the external memory address is not present in the cache (i.e., a cache miss), then the external memory address is not registered in the cache. Responsive to determining that the external memory address is not registered in the cache, method 400 continues to 406. Responsive to determining that the external memory address is registered in the cache, method 400 continues to 410.

At 406, the controller circuitry copies the data from the external memory address to a first internal memory address within an internal memory, such as internal memory 120 of processor 110. The internal memory address corresponds to an addressable location within the internal memory. In some embodiments, a mapping between the external memory address and the first internal memory address may be managed by a DMA controller, such as DMA controller 115 of system 100. For example, this may include mapping the memory space of the external memory into an address space of the processor. Thus, the DMA controller may access the external memory as if it were part of the internal memory, allowing the DMA controller to perform data transfers between the external memory and the internal memory without intervention from the processor.

At 408, the controller circuitry updates, within the cache, a first cache line associated with the external memory address to include a reference to the first internal memory address. In some embodiments, the first cache line includes a first portion corresponding to the first internal memory address, a second portion corresponding to a tag associated with the external memory address, and a third portion corresponding to an expiration number. In some embodiments, the controller circuitry invalidates the first cache line after a designated amount of time using the expiration number. In some embodiments, the first cache line is runtime configurable.

At 410, the controller circuitry identifies, within the cache, a second cache line associated with the external memory address. The second cache line includes a reference to a second internal memory address.

At 412, the controller circuitry copies the data from the second internal memory address to a third internal memory address within the internal memory. In some embodiments, the controller circuitry may read the data when it copies the data from the second internal memory address to the third internal memory address. The processor coupled to the controller circuitry may request a specific format or organization of the data to allow the processor to efficiently operate on the data. For example, the processor may request the data be organized in specific arrays or tensors, or with a particular format for the data elements (e.g., fixed-point numbers, floating-point numbers, etc.) Accordingly, the controller circuitry may copy the data from the second internal memory address, transform the copied data into appropriate data structures and formats requested by the processor, and store the transformed data at the third internal memory address.

At 414, the controller circuitry provides the data from the internal memory to the application.

Figure 5:
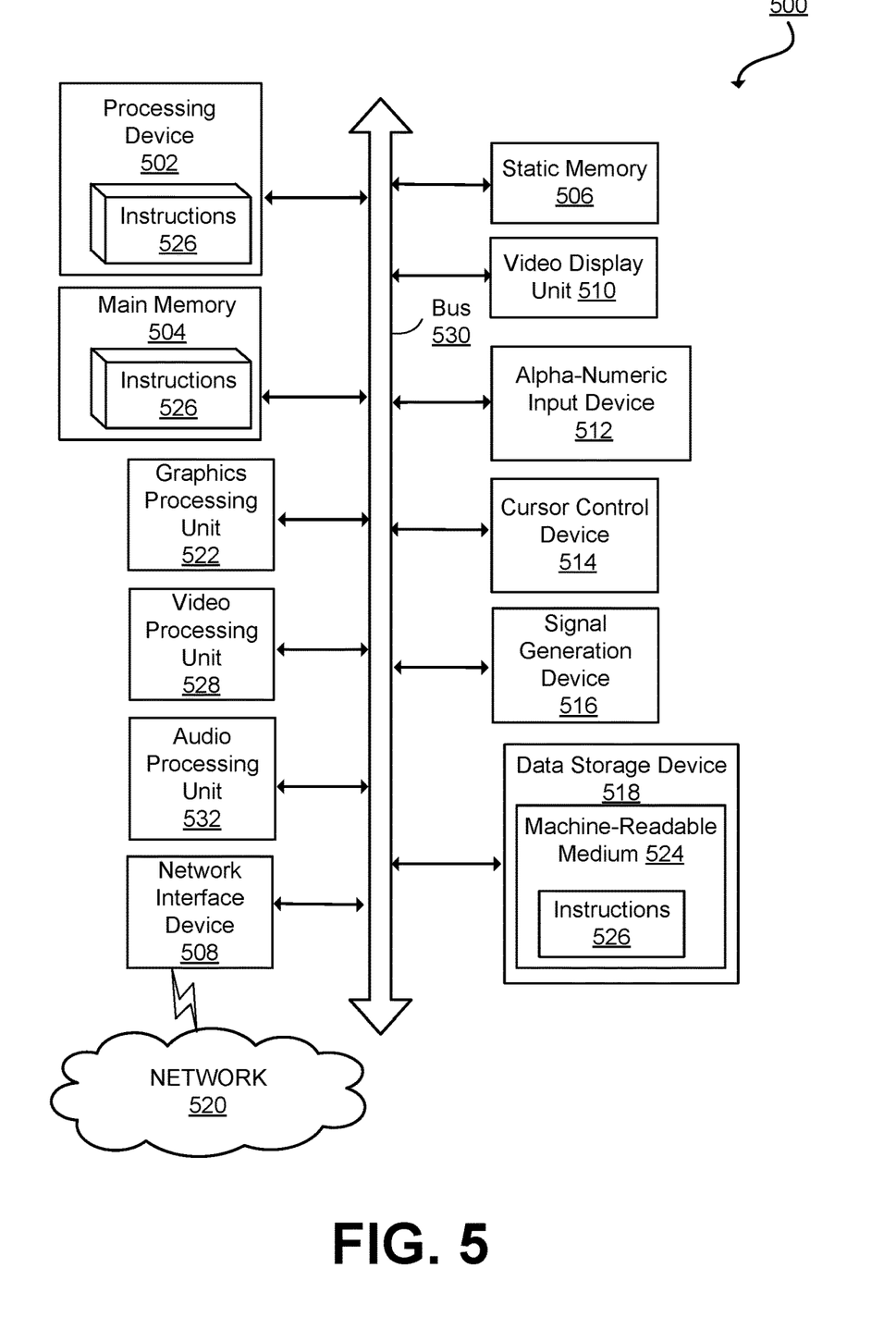
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform a similar sequence of procedures. In addition, the present disclosure is not described with reference to any particular programming language and any one in use in such computer systems may be used to implement the teachings of the disclosure as described herein.

The present disclosure may be provided as a computer program product, or software, that may include a non-transitory computer-readable storage medium (CRM) having stored thereon instructions, which may be used to program a computer system (or other electronic devices) to perform a process according to the present disclosure. A CRM includes any mechanism for storing information in a form readable by a machine (e.g., a computer). For example, a CRM includes a machine (e.g., a computer) readable storage medium such as a read only memory ("ROM"), random-access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element may be depicted in the figures and like elements are labeled with like numerals. The disclosure and drawings are, accordingly, to be regarded in an illustrative sense rather than a restrictive sense.

What is claimed is:

1. A system comprising:
   a processor comprising a cache and an internal memory; and
   controller circuitry, operatively coupled to the processor, the controller circuitry to perform operations comprising:
   receiving a request to provide an application with access to data stored at an external memory address of an external memory coupled to the controller circuitry;
   determining whether the external memory address is registered in the cache, indicating that the data was previously copied from the external memory to the internal memory;
   responsive to determining that the external memory address is registered in the cache, identifying, within the cache, a first cache line associated with the external memory address, the first cache line including a first reference to a first internal memory address within the internal memory;
   copying the data from the first internal memory address to a second internal memory address within the internal memory; and
   updating, within the cache, a second cache line to include a second reference to the second internal memory address.

2. The system of claim 1, wherein the controller circuitry is to perform operations further comprising:
   responsive to determining that the external memory address is not registered in the cache:
   copying the data from the external memory address to the first internal memory address within the internal memory; and
   updating, within the cache, the first cache line associated with the external memory address to include the first reference to the first internal memory address.

3. The system of claim 1, further comprising providing the data from the internal memory to the application.

4. The system of claim 2, wherein copying the data from the external memory address to the first internal memory address within the internal memory is performed responsive to determining that the external memory address is not registered in the cache.

5. The system of claim 1, wherein the first cache line comprises a first portion corresponding to the first internal memory address, a second portion corresponding to a tag associated with the external memory address, and a third portion corresponding to an expiration number.

6. The system of claim 5, further comprising, invalidating the first cache line using the expiration number.

7. The system of claim 6, wherein the first cache line is runtime configurable.

8. The system of claim 1, wherein the processor comprises a neural network (NN) accelerator, and the data comprises a data structure of input data associated with a workload of a NN application.

9. The system of claim 1, wherein the controller circuitry comprises a direct memory access (DMA) controller.

10. An apparatus comprising:
    a direct memory access (DMA) controller coupled to a processor and configured to perform operations comprising:
    receiving a request to provide an application with access to data stored at an external memory address of an external memory coupled to the DMA controller;
    determining whether the external memory address is registered in a cache, indicating that the data was previously copied from the external memory to an internal memory;
    responsive to determining that the external memory address is registered in the cache, identifying, within the cache, a first cache line associated with the external memory address, the first cache line including a first reference to a first internal memory address within the internal memory;
    copying the data from the first internal memory address to a second internal memory address within the internal memory of the processor; and
    updating, within the cache of the processor, a second cache line associated with the external memory address to include a second reference to the second internal memory address.

11. The apparatus of claim 10, wherein the DMA controller is configured to perform operations further comprising:
    responsive to determining that the external memory address is not registered in the cache:
    copying the data from the external memory address to the first internal memory address within the internal memory; and
    updating, within the cache, the first cache line associated with the external memory address to include the first reference to the first internal memory address.

12. The apparatus of claim 10, further comprising providing the data from the internal memory to the application.

13. The apparatus of claim 11, wherein copying the data from the external memory address to the first internal memory address within the internal memory of the processor is performed responsive to determining that the external memory address is not registered in the cache of the processor.

14. The apparatus of claim 10, wherein the first cache line comprises a first portion corresponding to the first internal memory address, a second portion corresponding to a tag associated with the external memory address, and a third portion corresponding to an expiration number.

15. The apparatus of claim 14, wherein the DMA controller is configured to perform operations further comprising:
    invalidating the first cache line using the expiration number.

16. The apparatus of claim 15, wherein the first cache line is runtime configurable.

17. The apparatus of claim 10, wherein the processor comprises a neural network (NN) accelerator, and the data comprises a data structure of input data associated with a workload of a NN application.

18. A method of managing a cache located on a processor, the method comprising:
    receiving, by controller circuitry coupled to the processor, a request to provide an application with direct memory access to data stored at an external memory address of an external memory coupled to the controller circuitry;
    determining whether the external memory address is registered in the cache, indicating that the data was previously copied from the external memory to an internal memory;
    responsive to determining that the external memory address is registered in the cache, identifying, within the cache, a first cache line associated with the external memory address, the first cache line including a first reference to a first internal memory address;
    copying, by the controller circuitry, the data from the first internal memory address to a second internal memory address within the internal memory of the processor; and
    updating, by the controller circuitry, a second cache line within the cache and associated with the external memory address to include a second reference to the second internal memory address; and
    providing, by the controller circuitry, the data from the internal memory to the application.

19. The method of claim 18, further comprising:
    responsive to determining that the external memory address is not registered in the cache:
       copying the data from the external memory address to the first internal memory address within the internal memory; and
       updating, within the cache, the first cache line associated with the external memory address to include the first reference to the first internal memory address.

20. The method of claim 19, wherein copying, by the controller circuitry, the data from the external memory address to the first internal memory address within the internal memory of the processor is performed responsive to determining that the external memory address is not registered in the cache.

* * * * *